Figure 1:
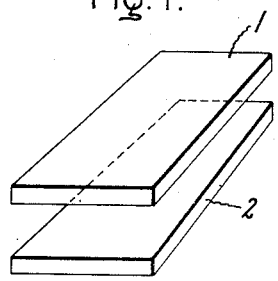

S. SCHNEIDER.
ELECTRIC HEATER.
APPLICATION FILED FEB. 6, 1914.

1,171,258.

Patented Feb. 8, 1916.

Witnesses:
George W. Tilden
J. Ellis Glenn

Inventor:
Stephan Schneider,
by Albert G. Davis
His Attorney.

UNITED STATES PATENT OFFICE.

STEPHAN SCHNEIDER, OF BERLIN-NIEDERSCHÖNHAUSEN, GERMANY, ASSIGNOR TO GENERAL ELECTRIC COMPANY, A CORPORATION OF NEW YORK.

ELECTRIC HEATER.

1,171,258.  Specification of Letters Patent.  Patented Feb. 8, 1916.

Application filed February 6, 1914. Serial No. 816,945.

*To all whom it may concern:*

Be it known that I, STEPHAN SCHNEIDER, a subject of the Emperor of Austria-Hungary, residing at Berlin-Niederschönhausen, Germany, have invented certain new and useful Improvements in Electric Heaters, of which the following is a specification.

My invention relates to a novel form of heat storage mass and to methods of operating and utilizing the heat thereof, and while my invention is particularly adapted for cooking operations, such as are commonly conducted on an electric range, it will be apparent that it is useful for other purposes.

Central stations, under the usual conditions of operation, are heavily loaded during a few hours of the twenty-four, or during the so-called peak hours, and during the remaining hours but a fraction of the energy which the station is capable of normally generating is utilized. When, however, an insulated heat storage mass of high heat storage capacity is utilized, to which a small amount of power is continuously furnished throughout the day, the central station can well afford to give a lower rate for the energy and thus make the use of electric energy more economical. In a heat storage mass the smallest possible radiating surface is desirable in order that it may be easily insulated; on the other hand it is desirable in order that the body may give up its heat quickly, that it have a relatively large heat delivery surface. In accordance with my invention these two properties are united by providing a heat storage mass formed of a plurality of members which are differently arranged for charging the mass with heat and for utilizing the heat thereof.

In its broader aspects, therefore, my invention has for its object a novel method of storing and utilizing the heat of a storage mass having a variable heat delivering surface which consists in reducing the heat delivering surface of the mass to a minimum for the purpose of electrically charging the same and storing the heat therein and increasing said surface for the purpose of utilizing the heat; more specifically my invention provides a method of storing and utilizing the electrically produced heat of a storage mass formed of a plurality of members which consists in charging the members in their closed position, and separating the members in order to utilize the heat radiated from the interior surfaces thereof. My invention also provides a novel form of storage mass for carrying out this process. Regarded in another light, my invention also provides a storage mass formed of a plurality of members which are insulated for the purpose of charging the same and storing heat therein and which are separated, thereby exposing the inner surfaces, for the purpose of utilizing the heat of the mass.

Other objects of my invention will be apparent from the specification and will be pointed out in the claims.

For a fuller understanding of my invention, reference may be had to the accompanying drawings in which—

Figures 2, 3:
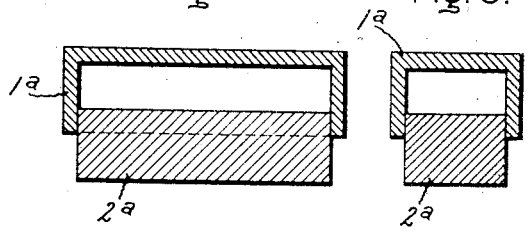
Figure 4:
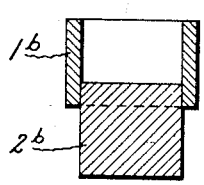
Figure 5:
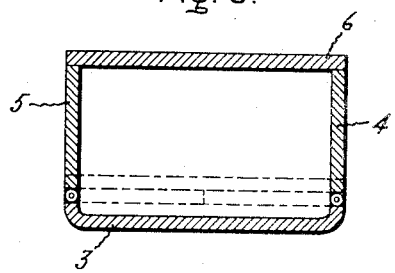
Figure 6:
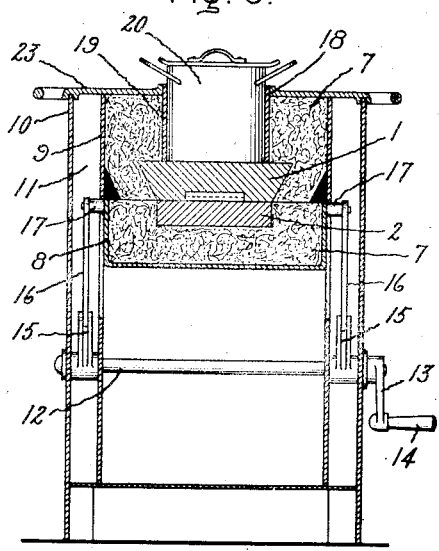
Figure 7:
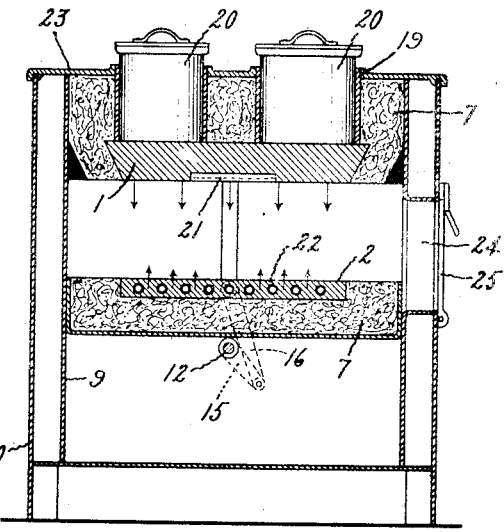

Figure 1 is a perspective view showing one form of my invention comprising a storage mass formed of two separable plates; Fig. 2 is a modification of Fig. 1, the upper member of the storage mass being provided with a flange depending from the outer edge and inclosing the lower plate; Fig. 3 is a cross section of Fig. 2; Fig. 4 shows a storage mass closely surrounded by a shell closely embracing the same in its closed position; Fig. 5 is a section showing still another modification of my invention; Fig. 6 is a vertical sectional view of a heating device comprising a storage mass made in accordance with one of the forms of my invention; and Fig. 7 is a vertical section taken at right angles to Fig. 6.

In Fig. 1, the storage mass consists of two similar flat plates 1 and 2 which may conveniently be made rectangular in transverse section, which for charging are laid together, and in this position are heated by an electric heating unit (not shown) located preferably between the two plates. In this position no heat losses except through the outer surfaces of the two plates are possible as no heat is lost from the interior engaging surfaces. In this form of my invention the device is equally well adapted to give up stored heat for boiling or other operations conducted on the top of the upper plate and for roasting or other operations which requires radiant heat. For boiling and similar operations, the heat is taken from the upper surface of the storage mass which may be left closed for this purpose. For roasting and other similar operations requiring radiant heat, the plates are drawn apart and the article to be cooked is inserted between the two plates. It will thus be apparent that boiling or a similar operation may be conducted on the storage mass, or two operations such as boiling and roasting may be simultaneously carried out, the latter in such a way as to regulate the distance of the plates and thus regulate the amount of heat to which the article is to be subjected.

Figs. 2 and 3 show in section a modification of the structure shown in Fig. 1. The storage mass $2^a$ which may conveniently be made rectangular in transverse section, is surmounted and partially inclosed by a plate $1^a$ which is provided with a depending flange around its outer edge which closely surrounds the plate $2^a$. In the separated position of the two members it will be apparent that an inclosed space is formed between the two members in which roasting or similar operations may be conducted.

Fig. 4 shows a heat storage mass comprising a storage body $2^b$ closely surrounded by a shell or sleeve $1^b$ which in its lowered position forms a compact storage mass; and which in its elevated position forms a pocket which is particularly adapted for the reception of a vessel in which cooking operations are to be performed.

Fig. 5 shows a storage mass comprising a bottom plate 3, at the edges of which are hinged two plates 4 and 5 which close together, as indicated in dotted lines. A top plate 6 is also preferably provided which in the open position of the members forms with the plates 4 and 5 an interior chamber in which roasting or similar operations are conducted. In the closed position of the parts, the plate 6 is laid on the plates 4 and 5, as indicated in dotted lines.

In Figs. 6 and 7 I have shown the form of my invention illustrated in Fig. 1 embodied in a complete heating device. The upper member 1 of the storage mass may be made in the form of a keystone of an arch so that it is firmly supported in the surrounding heat insulation 7 which in turn is stationary with respect to the frame of the heating device. The lower member 2 of the storage mass is also suitably mounted in heat insulation 7 which in turn is supported in a cupped plate 8. This plate and the insulation surrounding the plate 1 are inclosed by an inner metallic plate 9 which is in turn surrounded by a metallic plate or shell 10 spaced from the inner shell 9 to form an insulating air space 11.

A suitable mechanism is provided for lowering the under member 2 of the storage mass, together with the insulation and cupped plate in which the mass is mounted away from the upper member 1. This mechanism comprises, in the form here shown, a shaft 12 mounted in the inner and outer shells 9 and 10 respectively. This shaft is provided with a crank arm 13 and a suitable handle 14 by which the shaft may be rotated. The shaft is provided with two arms 15, the outer ends of which are connected by links 16 to lugs 17 secured to the cupped plate 8. It will thus be apparent that the lower member 2 of the storage mass may be lowered from the upper member and the distance between the two is adjustable to vary the degree of heat to which an article located between the two plates will be subjected.

Preferably, pockets 18 are provided in the top of the device extending from its upper surface to the upper surface of the member 1 of the storage mass. These pockets may be provided with a suitable lining 19, preferably formed of heat insulating material. Cooking vessels 20 are adapted to be received in the pockets and engage the upper plate 1.

I have shown electric heaters 21 and 22 for the upper and lower plates 1 and 2 respectively, but it will be apparent that a single heater may be used in either of the plates. The top of the device is closed by a suitable top plate 23 and a suitable opening 24 closed by a door 25 extending through the plates 9 and 10, affords communication with the heating space formed between the members 1 and 2 of the storage mass.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. An electric heating device comprising a heat storage mass of high heat storage capacity formed of a plurality of separable parts made to fit closely together in their closed positions, and means for rendering both the exterior and interior surfaces of the separable members simultaneously effective for cooking operations.

2. An electric heating device comprising a heat storage mass of high heat storage capacity formed of a plurality of members which fit closely together in their closed positions, thermal insulating means for said members, means for separating the members, and means coöperating with said members to form a chamber in which the article to be heated is received.

3. In a heating device, a heat storage mass comprising two plates located the one above the other, means for thermally insulating said plates, an electric heating device located near the surface of one of the plates, means for depressing the lower plate to form a space between the two, coöperating thermal insulation to complete the closure of said space to form a chamber, and a closable opening in said insulation through which articles to be heated may be inserted into said chamber.

4. In a heating device, a heat storage mass comprising two plates located the one above the other, means for thermally insulating said plates, means for separating the plates to form a space between the same, coöperating thermal insulating means to complete the closure of said space to form a chamber, said thermal insulating means being provided with a closable opening through which articles to be heated may be inserted into said chamber, and one or more pockets communicating with the upper surface of the upper plate in which cooking utensils may be received.

5. A heating device comprising a heat storage mass having high heat storage capacity and good conductivity and formed of two separable members, means for separating said members and for adjusting the space between them, and means coöperating with said members to form a chamber in which the article to be heated is received.

6. An electric heating device comprising a heat storage mass formed of an upper stationary section and a lower section movable into and out of engagement with the upper section, and means for heat-insulating the mass both in the engaged and disengaged positions of the sections.

7. An electric heating device comprising a heat storage mass formed of an upper stationary section and a lower section movable into and out of engagement with the upper section, means for heat-insulating the mass in both the engaged and disengaged positions of the sections, and means for rendering the top of the upper section and the space between the two sections effective for conducting cooking operations.

In witness whereof, I have hereunto set my hand this 19th day of January, 1914.

STEPHAN SCHNEIDER.

Witnesses:
JULIUS RUMLAND,
RICHARD DAVID.